United States Patent
Boydens et al.

(10) Patent No.: US 11,467,593 B2
(45) Date of Patent: Oct. 11, 2022

(54) AGRICULTURAL SYSTEM

(71) Applicant: CNH Industrial America LLC, New Holland, PA (US)

(72) Inventors: Joachim Boydens, Zedelgem (BE); Thomas Debbaut, Ronsele (BE); Didier Verhaeghe, Ypres (BE)

(73) Assignee: CNH Industrial America LLC, New Holland, PA (US)

( * ) Notice: Subject to any disclaimer, the term of this patent is extended or adjusted under 35 U.S.C. 154(b) by 234 days.

(21) Appl. No.: 16/612,258

(22) PCT Filed: May 9, 2018

(86) PCT No.: PCT/EP2018/062050
§ 371 (c)(1),
(2) Date: Nov. 8, 2019

(87) PCT Pub. No.: WO2018/206669
PCT Pub. Date: Nov. 15, 2018

(65) Prior Publication Data
US 2020/0174491 A1  Jun. 4, 2020

(30) Foreign Application Priority Data

May 9, 2017  (BE) .................................. 2017/5340

(51) Int. Cl.
*G05D 1/02* (2020.01)
*A01F 15/08* (2006.01)

(52) U.S. Cl.
CPC ........... *G05D 1/0223* (2013.01); *A01F 15/08* (2013.01); *G05D 2201/0201* (2013.01)

(58) Field of Classification Search
CPC .......... G05D 1/0223; G05D 2201/0201; A01F 15/08; G06Q 10/04; G06Q 50/02; G06Q 10/047; H04L 29/02
See application file for complete search history.

(56) References Cited

U.S. PATENT DOCUMENTS 9,008,920 B1 * 4/2015 Smith ................... A01F 15/08
701/50
2010/0036569 A1 2/2010 Hel et al.
(Continued)

FOREIGN PATENT DOCUMENTS

EP 1548531 A1 6/2005
WO 2014/137533 A2 9/2014

OTHER PUBLICATIONS

Zhang, Chi and Noboru Noguchi. "Development of a multi-robot tractor system for agriculture field work." Comput. Electron. Agric. 142 (2017): 79-90. (Year: 2017).*
(Continued)

*Primary Examiner* — James J Lee
*Assistant Examiner* — Shon G Foley
(74) *Attorney, Agent, or Firm* — Peter Zacharias; Patrick Sheldrake (57) ABSTRACT

A system including a controller associated with an agricultural vehicle. The controller is configured to: receive other-vehicle-data that is representative of another vehicle that is in an agricultural field; and determine route-plan-data that is representative of a route to be taken by the agricultural vehicle in the agricultural field, based on the other-vehicle-data.

19 Claims, 3 Drawing Sheets

(56) References Cited

U.S. PATENT DOCUMENTS

| | | |
|---|---|---|
| 2012/0112896 A1 | 5/2012 | Clair et al. |
| 2016/0120095 A1* | 5/2016 | Fujimoto ............. G05D 1/0219 701/24 |
| 2018/0316895 A1* | 11/2018 | McClelland ........... H04N 7/188 |
| 2019/0039618 A1* | 2/2019 | Mori ..................... B60W 10/20 |

OTHER PUBLICATIONS

International Search Report and Written Opinion for Application No. PCT/EP2018/062050 dated Jun. 28, 2018 (11 pages).

* cited by examiner

AGRICULTURAL SYSTEM

BACKGROUND OF THE INVENTION

Determining an accurate route plan for an agricultural machine in an agricultural field can enable crop material to be picked up in an efficient way, in terms of the length of time the operation takes, and the amount of fuel used by the machine, for example. In some applications, agricultural machines can be operated autonomously using such a route plan.

SUMMARY OF THE INVENTION

According to a first aspect of the invention, there is provided a system comprising: a controller associated with an agricultural vehicle, the controller configured to: receive other-vehicle-data that is representative of another vehicle that is in an agricultural field; and determine route-plan-data that is representative of a route to be taken by the agricultural vehicle in the agricultural field, based on the other-vehicle-data.

The controller may be configured to determine the route-plan-data such that the agricultural vehicle will avoid the other vehicle.

The other-vehicle-data may comprise other-vehicle-route-data that is representative of a route to be taken by the other vehicle.

The other-vehicle-data may comprise other-vehicle-dimension-data that is representative of the size and/or shape of the other vehicle.

The other-vehicle-data may comprise other-vehicle-location-data that is representative of a location of the other vehicle.

The other-vehicle-location-data may comprise one or more of: past-other-vehicle-location-data, which is representative of a previous location of the other vehicle; current-other-vehicle-location-data, which is representative of a current location of the other vehicle; and future-other-vehicle-location-data, which is representative of a future location of the other vehicle.

The other-vehicle-data may comprise other-vehicle-speed-data that is representative of the speed of the other vehicle.

The other-vehicle-data may comprise other-vehicle-direction-data that is representative of a direction of travel of the other vehicle.

The controller may be further configured to: receive field-data that is representative of crop material that is to be picked up from the agricultural field by the agricultural vehicle; and determine the route-plan-data also based on the field-data.

The controller may be configured to receive updated field-data as the agricultural machine picks up the crop material from the agricultural field.

The controller may be configured to determine the route-plan-data by modifying an earlier route plan whilst the agricultural vehicle is in use in the agricultural field.

The baler may have a baler-priority-value associated with it. The other vehicle may have an other-vehicle-priority-value associated with it. The controller may be configured to: compare the baler-priority-value with the other-vehicle-priority-value, and only modify the earlier route plan if the baler-priority-value represents a lower priority than the other-vehicle-priority-value.

The controller may be configured to determine vehicle-control-instructions for the agricultural vehicle, based on the route-plan-data.

The vehicle-control-instructions may comprise vehicle-steering-instructions for automatically controlling the direction of travel of the agricultural vehicle.

The vehicle-control-instructions may further comprise route-speed-instructions for automatically controlling the speed of the agricultural vehicle at locations along the route.

The system may further comprise: an unmanned vehicle configured to acquire: field-data, representative of an agricultural field that has the other vehicle in it; and field-location-data associated with the field-data. The controller may be configured to determine the other-vehicle-data based on the field-data and the field-location-data.

The controller may be further configured to: determine other-vehicle-dimension-data that is representative of the size of the other vehicle, based on the field-data; and determine the route-plan-data also based on the other-vehicle-dimension-data.

The route-plan-data may be representative of a route to be taken by the agricultural vehicle for an entire unprocessed portion of the agricultural field.

The system may further comprise an agricultural vehicle that is configured to be operated in accordance with the vehicle-control-instructions. The agricultural vehicle may be a baler.

There may be provided a computer program, which when run on a computer, causes the computer to configure any apparatus, including a controller, processor, machine, vehicle or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples.

The computer program may be provided on a computer readable medium, which may be a physical computer readable medium such as a disc or a memory device, or may be embodied as a transient signal. Such a transient signal may be a network download, including an internet download.

BRIEF DESCRIPTION OF THE DRAWINGS

Embodiments of the present invention will now be described by way of example and with reference to the accompanying drawings in which.

DETAILED DESCRIPTION OF THE DRAWINGS

Figure 1:
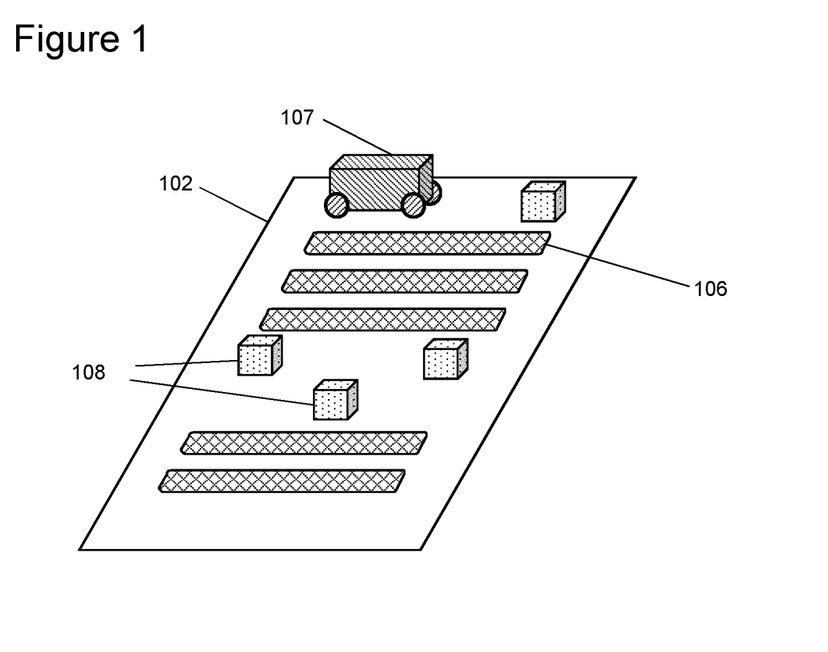
FIG. 1 shows an example of an agricultural field.
Figure 2:
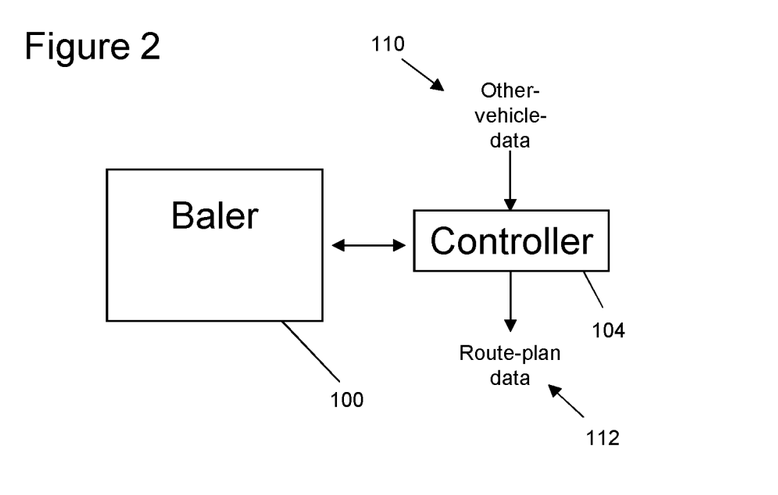
FIG. 2 shows schematically a system that is associated with determining a route for an agricultural vehicle to follow in an agricultural field.

FIG. 2 shows schematically a system that is associated with determining a route for an agricultural vehicle to follow in an agricultural field 102, as shown in FIG. 1. In this example, the agricultural vehicle is a baler 100. The system includes a controller 104 that is associated with the baler 100. It will be appreciated that the controller 104 can be located on the baler 100, or remotely from the baler 100. For example, the functionality of the controller 104 can be performed on a remote server, such as one "in the cloud".

The field 102 includes rows of crop material, which may be hay, straw or similar products that have been left in the field 102 in the form of swaths 106. The swaths 106 are elongate rows of the products in question that are heaped in the transverse centre and tend to flatten at the respective transverse edges. Typically a field 102 that has undergone harvesting contains many, essentially mutually parallel, swaths 106, as shown in FIG. 1. The swaths are spaced from one another by largely consistent gaps. The crop material in the swaths 106 can be picked up by the baler 100, and then deposited in the field 102 as bales 108. The field 102 that is shown in FIG. 1 has been partly processed, in that it includes both rows of swath 106 for baling, and also completed bales 108.

It will be appreciated that more than one agricultural machine may be working in the field 102 simultaneously. For example: a plurality of balers may be operational in the field 102 at the same time; or a tractor with a trailer for collecting the bales 108 may be in the field 102 at the same time as the baler 100. One or more of the controllers 104 disclosed herein can determine a route for an agricultural machine (such as the baler 100 of FIG. 1) that takes into account information about another vehicle 107 that is in the field 102. This can reduce the likelihood of the agricultural machine colliding with the other vehicle 107.

Controllers disclosed herein can also be used with agricultural machines that are not balers. For example, the agricultural machine may be a tractor, a forage harvester a combine harvester or a telehandler for gathering bales, and the controller 104 can plan a route for the agricultural machine such that it takes into account information about any other vehicle 107 that is in the field 102, or will be in the field 102, at the same time as the agricultural machine.

In some embodiments, a controller (which may or not be the controller 104 associated with the baler 100 as it is shown in FIG. 2) can be used to determine initial route-plan-data 112 based on other-vehicle-data 110 that is representative of another vehicle 107 that will be in the agricultural field 102 at the same time as the baler 110. In this way, the route-plan-data 112 can be determined before the baler 100 and/or the other vehicle 107 enters the field 102.

Optionally, at least the baler 100 and the other vehicle 107 may have priority-values associated with them so that a hierarchy can be used when determining route-plans for the vehicles. In one example, swath-data is available for the field 102 in advance of the baling operation (for example as acquired by a drone, as will be discussed below). Then, a controller 104 associated with the 'master' machine (the vehicle that has the highest priority) can determine route-plan-data for all machines/vehicles in advance of them beginning operation in the field 102. If complete swath-data is not available, then in some examples the controller can use information representative of the locations of the ends of the swath 106, and then predict swath-location-data representative of the locations of the swath. In some examples, the locations of the swath ends can be detected during baling of the headland. It will be appreciated that any field-data, which is representative of an agricultural field that is to be processed by the baler 100 (or any other agricultural vehicle), can be used by the controller 104 to determine route-plan-data for a plurality of agricultural vehicles, optionally also using priority-values associated with each of the agricultural vehicles.

Such initial planning can be performed by a controller associated with a 'master' machine, or a supervising controller that can be located in the cloud or can be associated with a drone, as non-limiting examples.

The controller 104 can optionally, when performing such an initial planning phase, use user-preference-data for determining the route-plan-data. In some examples, the controller 104 can use user-preference-data that are associated with the 'master' machine/vehicle.

In some embodiments, the controller 104 associated with the baler 100 receives other-vehicle-data 110 that is representative of another vehicle 107 that is in the agricultural field 102, and determines route-plan-data 112.

As will be discussed in more detail below, the other-vehicle-data 110 can include one or more of: other-vehicle-route-data, other-vehicle-dimension-data, other-vehicle-location-data, other-vehicle-speed-data, and other-vehicle-direction-data. The route-plan-data 112 is representative of a route to be taken by the baler 100 in the agricultural field, based on the other-vehicle-data 110. As will be discussed in detail below, such processing can enable a route plan for the baler 100 to be adapted in real-time, whilst the baler 100 is in the field 102, to avoid the other vehicle 107.

In some examples the controller 104 can determine the route-plan-data 112 by modifying an earlier route plan whilst the baler 100 is in use in the field 102. For instance, an initial route plan can be generated for the baler 100 to pick up the swaths 106 of crop material. However, when that initial route plan is generated, it may not be possible to accurately determine where other vehicles 107 are going to be whilst the baler 100 follows the initial route.

The route-plan-data 112 can comprise a sequence of locations for the baler 100 to pass when picking up the crop material in the swaths 106. For example, the controller 104 can determine a shortest possible route for picking up all of the crop material, whilst avoiding the other vehicle 107 in the field 102.

In examples where the baler 100 is pulled by a tractor, the route-plan-data 112 can include baler-route-plan-data and tractor-route-plan-data. In this way, the controller 104 can ensure that both the baler 100 and the tractor avoid the other vehicle 107. It may only be necessary to provide the tractor-route-plan-data as an output because it is this data that can be used by an operator to drive the tractor such that the baler 100 follows the desired route. Alternatively, the tractor can be controlled autonomously using the tractor-route-plan-data, such that the baler 100 follows the desired route. It will be appreciated that any description in this document of controlling the baler 100, can equally apply to controlling a tractor that is pulling the baler 100 (or controlling any other agricultural machine). This is because any such control of the tractor can be considered as indirectly controlling the baler 100.

The route-plan-data 112 can be representative of a route to be taken by the baler 100/tractor for an entire unprocessed/un-baled portion of the field 102. That is, the route-plan-data 112 can be determined such that it takes into account the portions of the field 102 that have already been baled, whilst ensuring that a route is planned for baling the crop material in each of the remaining swaths 106.

In some examples, the controller 104 can determine the route-plan-data such that the baler 100 will avoid the other vehicle 107.

The other-vehicle-data 110 can be received from the other vehicle 107 in the agricultural field, or from any processor associated with the other vehicle 107. For example, a remote processor that autonomously controls the other vehicle 107.

In some examples, inter-vehicle communication can be used to transfer data between the baler 100 and the other vehicle 107. This communication can be direct or through "the cloud".

The other-vehicle-data can include other-vehicle-route-data that is representative of a route to be taken by the other vehicle 107. This may be an initial route that was planned for the other vehicle 107, or may be a dynamically modified route for the other vehicle 107. In this way, relatively long term predictions and planning can be performed, for example to cover the duration of the agricultural operation (which could be baling). This can result in improved/optimal routes for one or both of the baler 100 and the other vehicle 107.

In some applications, at least the baler 100 and the other vehicle 107 may have priority-values associated with them so that a hierarchy can be used when determining/modifying route-plans for the vehicles. For example, the controller 104 can compare a baler-priority-value with an other-vehicle-priority-value, and only modify an earlier route plan for the baler 100 if the baler-priority-value represents a lower priority than the other-vehicle-priority-value. If the baler-priority-value represents a higher priority than the other-vehicle-priority-value, then the controller 104 may not modify an existing route plan for the baler 100, on the basis that the route plan for the other vehicle 107 is expected to be changed instead. In examples where the other vehicle 107 is also a baler, functionality described herein can enable efficient routes to be generated such that multiple balers can operate simultaneously in the field 102.

In some examples, the other-vehicle-data 110 includes other-vehicle-location-data that is representative of a location of the other vehicle 107. The other-vehicle-location-data can include one or more of: (i) past-other-vehicle-location-data, which is representative of a previous location of the other vehicle 107; (ii) current-other-vehicle-location-data, which is representative of a current location of the other vehicle 107; and (iii) future-other-vehicle-location-data, which is representative of an expected future location of the other vehicle 107. The controller 104 can optionally determine such other-vehicle-location-data by processing other-vehicle-route-plan-data that is representative of a route that is to be taken, or is being taken, by the other vehicle 107 in the field 102. In some examples, the other-vehicle-location-data, especially the past-other-vehicle-location-data and/or the current-other-vehicle-location-data, may be provided by a location-determining-system (such as a GPS receiver) associated with the other vehicle 107.

The controller 104 may process other-vehicle-route-start-time data, which is representative of the start time of the other vehicle 107 following its current route, in order to determine the current-other-vehicle-location-data and/or the future-other-vehicle-location-data. In this way, other-vehicle-time-stamps can be associated with the current-other-vehicle-location-data, and/or with specific locations that are represented by the future-other-vehicle-location-data.

The controller 104 can then determine the route-plan-data 112 based on the other-vehicle-location-data. For example, the controller 104 can determine a sequence of locations that the baler 100 will occupy in the future, and associated agricultural-vehicle-time-stamp values, as it follows a current route-plan. The controller 104 can then compare this information with the other-vehicle-time-stamps that are associated with the future-other-vehicle-location-data. If the controller 104 determines that the difference between the locations of the baler 100 and the other vehicle 107 is less than a threshold-difference at any future instant in time, then the controller 104 may determine new route-plan-data by modifying the current/earlier route plan, such that when the baler 100 follows the new route-plan, the difference between the locations of the baler 100 and the other vehicle 107 will not be less than a threshold-difference at any future instant in time. For instance, the controller 104 may determine new route-plan-data by modifying the earlier route-plan such that baler 100 slows down whilst following the same trajectory as that of the earlier route-plan.

In some examples, the other-vehicle-data comprises other-vehicle-speed-data that is representative of the speed of the other vehicle 107. The other-vehicle-speed-data can include one or more of: (i) past-other-vehicle-speed-data, which is representative of a previous speed of the other vehicle 107; (ii) current-other-vehicle-speed-data, which is representative of a current speed of the other vehicle 107; and (iii) future-other-vehicle-speed-data, which is representative of an expected future speed of the other vehicle 107. The controller 104 can optionally determine such other-vehicle-speed-data by processing other-vehicle-route-plan-data that is representative of a route that is to be taken, or is being taken, by the other vehicle 107 in the field 102, and the speed that the other vehicle 107 is intended to have at various points along the route. The controller 104 may also process other-vehicle-route-start-time data in order to determine the current-other-vehicle-speed-data and/or the future-other-vehicle-speed-data at various points in time in the future. In some examples, the other-vehicle-speed-data, especially the past-other-vehicle-speed-data and/or the current-other-vehicle-speed-data, may be provided by a speedometer or a location-determining-system associated with the other vehicle 107.

Optionally, the controller 104 may process the past-other-vehicle-speed-data and the current-other-vehicle-speed-data in order to make a statistical prediction of the future-other-vehicle-speed-data. For instance, if the other vehicle 107 has been travelling at the same speed for a threshold-period of time, then the controller 104 may predict that the other vehicle 107 will continue to travel at that speed, and therefore attribute a historical speed value for the future-other-vehicle-speed-data.

The controller 104 can process the other-vehicle-speed-data in order to determine the future-other-vehicle-location-data. Therefore, the controller 104 can determine the route-plan-data 112 based on, directly or indirectly, the other-vehicle-speed-data.

In some examples, the other-vehicle-data comprises other-vehicle-direction-data that is representative of the direction of travel of the other vehicle 107. The other-vehicle-direction-data can include one or more of: (i) past-other-vehicle-direction-data, which is representative of a previous direction of the other vehicle 107; (ii) current-other-vehicle-direction-data, which is representative of a current direction of the other vehicle 107; and (iii) future-other-vehicle-direction-data, which is representative of an expected future direction of the other vehicle 107. The controller 104 can optionally determine such other-vehicle-direction-data by processing other-vehicle-route-plan-data that is representative of a route that is to be taken, or is being taken, by the other vehicle 107 in the field 102, and the direction that the other vehicle 107 is intended to have at various points along the route. The controller 104 may also process other-vehicle-route-start-time data in order to determine the current-other-vehicle-direction-data and/or the future-other-vehicle-direction-data at various points in time in the future. In some examples, the other-vehicle-direction-data, especially the past-other-vehicle-direction-data and/or the current-other-vehicle-direction-data may be provided by a gyroscope or a location-determining-system associated with the other vehicle 107.

Optionally, the controller 104 may process the past-other-vehicle-direction-data and the current-other-vehicle-direction-data in order to make a statistical prediction of the future-other-vehicle-direction-data. For instance, if the other vehicle 107 has been travelling in the same direction for a threshold-period of time, then the controller 104 may predict that the other vehicle 107 will continue to travel in that direction, and therefore attribute a historical direction value for the future-other-vehicle-direction-data.

The controller 104 can process the other-vehicle-direction-data in order to determine the future-other-vehicle-location-data. Therefore, the controller 104 can determine the route-plan-data 112 based on, directly or indirectly, the other-vehicle-direction-data.

In some examples, the other-vehicle-data comprises other-vehicle-dimension-data that is representative of the size and/or shape of the other vehicle. The other-vehicle-dimension-data may be fixed/hard-coded for a specific type of other vehicle 107, or it may be determined using one or more sensors. In such examples, the controller 104 can determine the other-vehicle-location-data as a multiple set of coordinates for the other vehicle 107. The multiple set of coordinates may be representative of the locations of one or more corners of the other vehicle 107, for example, and may be sufficient such that, together, they can be used to determine the perimeter of a two-dimensional footprint of the other vehicle 107 (when viewed from above), or to determine the perimeter of the three-dimensional volume of the other vehicle 107.

The controller 104 can determine the multiple sets of coordinates by applying offsets to the location of the other vehicle 107 (other-vehicle-location-data) at any point along a route that is to be followed by the other vehicle 107. The controller 104 can determine the offsets based on the other-vehicle-dimension-data.

The controller 104 can then determine the route-plan-data 112 based on the other-vehicle-dimension-data, optionally in combination with the other-vehicle-location-data.

Therefore, the other-vehicle-data can include data relating to one or more of the other vehicle's location, dimensions, groundspeed and planned route (desired trajectory) if available. In some examples, the other-vehicle-data 110 can be determined from sensor data that is acquired from a sensor that monitors the other vehicle 107. For instance, an unmanned aerial vehicle can acquire image data using a camera in order for the movement of the other vehicle 107 to be monitored.

Figure 3:
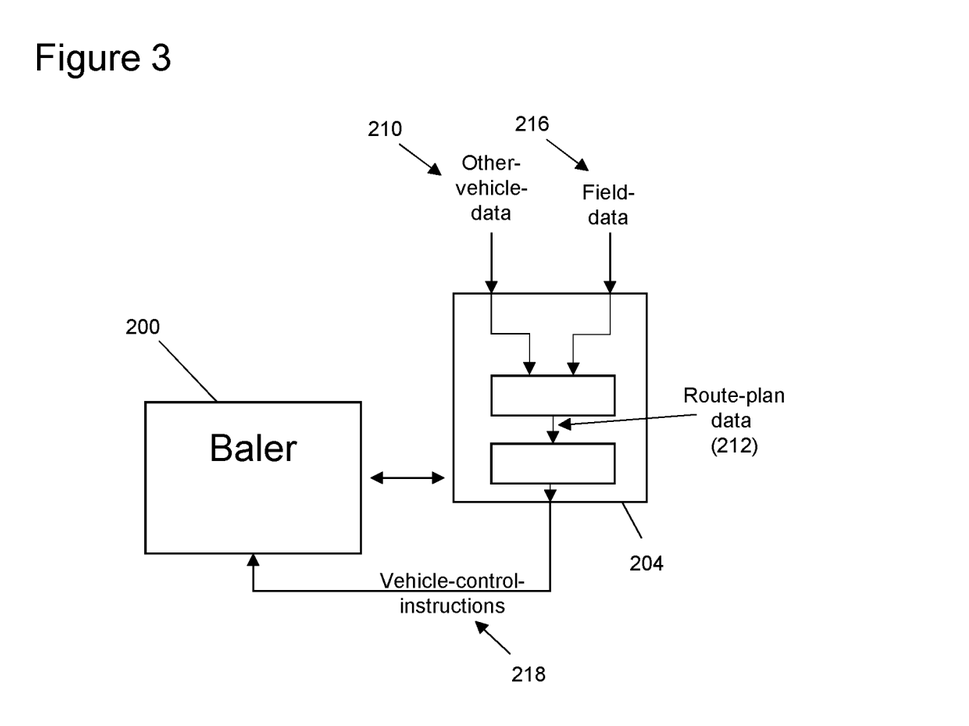
FIG. 3 shows schematically another system that is associated with determining a route that a baler can follow in an agricultural field.

FIG. 3 shows schematically another system that is associated with determining a route that a baler 200 can follow in an agricultural field (as shown in FIG. 1). The system includes a controller 204 and the baler 200. The controller 204 can be used to autonomously control the baler 200 (or a tractor that pulls the baler 200). That is, the system can be considered as including the baler 200 that is configured to be operated in accordance with vehicle-control-instructions.

In this example the controller 204 receives other-vehicle-data 210 and field-data 216, and determines the route-plan-data 212 based on the other-vehicle-data 210 and the field-data 216 as will be described below.

The controller 204 determines vehicle-control-instructions 218 for the baler 200, based on the route-plan-data 212. The vehicle-control-instructions 218 can comprise vehicle-steering-instructions for automatically controlling the direction of travel of the baler 200, such that the baler 200 follows a specific route through the agricultural field. In this way, the baler 200 can be autonomously controlled such that it follows a specific route through the agricultural field in order to pick up crop material from the field. In addition to, or instead of, avoiding an other vehicle that is in the field, as discussed above, the route can be planned such that it provides one or more advantages, for example:

(i) efficient baler/tractor usage, such as low overall fuel consumption to pick up and bale all of the crop material from the field;

(ii) efficient baling in terms of the time required to bale all of the crop material in the field; and (iii) prioritising pick up of crop material with particular characteristics (as defined by crop-property-data for example, as will be discussed below), such as portions of swath that have a high volume of crop material.

In some examples, the controller 204 can also use baler-location data and/or baler-direction-data, that is representative of a current location and direction of travel of the baler 200 for which the route plan is being determined, to determine the route-plan-data 212.

The vehicle-control-instructions can also comprise route-speed-instructions for automatically controlling the speed of the baler 200 at locations along the route. For instance, the vehicle-control-instructions can also comprise vehicle-steering-instructions and route-speed-instructions such that the baler 200 can make a turn in the field with a desired turning angle, at an appropriate speed for the turn, such that the baler 200 avoids another vehicle that is in the field.

As indicated above, in this example, the controller 204 also receives field-data 216, which is representative of an agricultural field that is to be processed by the baler 200. For example, the field-data 216 is representative of the swaths of crop material that are to be picked up from the field by the baler. In one instance, the field-data 216 can be representative of the location of the swaths of crop material that are still to be baled. The field-data 216 can also be representative of one or more properties of the swaths of crop material. In some examples, the controller 204 receives updated field-data 216 as the baler 200 picks up the crop material from the field.

The controller 204 can determine the route-plan-data 212 also based on the field-data 216. In this way, both the locations of one or more other vehicles, and properties of the un-baled swaths (such as the locations of the swaths), can be used to determine the route-plan-data 212. In other examples, the field-data 216 can be used to determine the other-vehicle-data 210, as will be discussed detail below with reference to FIG. 4.

In some examples, any controller disclosed herein can determine route-plan-data such that an agricultural vehicle takes a path that has a predetermined relationship with a route of the other vehicle. In one example, the controller can determine the route-plan-data such that the agricultural vehicle follows a path (at least for a threshold distance/time) that is parallel with, and spaced apart by a predetermined distance from, a path that is to be followed by the other vehicle. For example, the route can be planned so that material or fuel can be transferred between the agricultural vehicle and the other vehicle. Such examples can be particularly relevant for combine and forage harvesters, or any other agricultural vehicle that transfers crop material between vehicles, including containers that are towed by vehicles. In one specific example, a first combine harvester can unload into a second combine harvester next to it, and the second combine harvester then unloads into a truck. Such examples can benefit from route-plan-data being determined for two or more of the vehicles, such that it that takes into account other-vehicle-data.

A possible control strategy could be to divide the field into zones, then then dedicate different zones to different machines. Another strategy could be to keep the machines close to each other, for example in big fields it may be disadvantageous for a plurality of machines/vehicles to be long distances away from each other. Therefore, route-plan-data can be determined for a plurality of agricultural vehicles such that a distance between their instantaneous locations whilst following the routes is less than a threshold-distance. In this way, a vehicle can be said to take a path that has a predetermined relationship with a route of the other vehicle.

Figure 4:
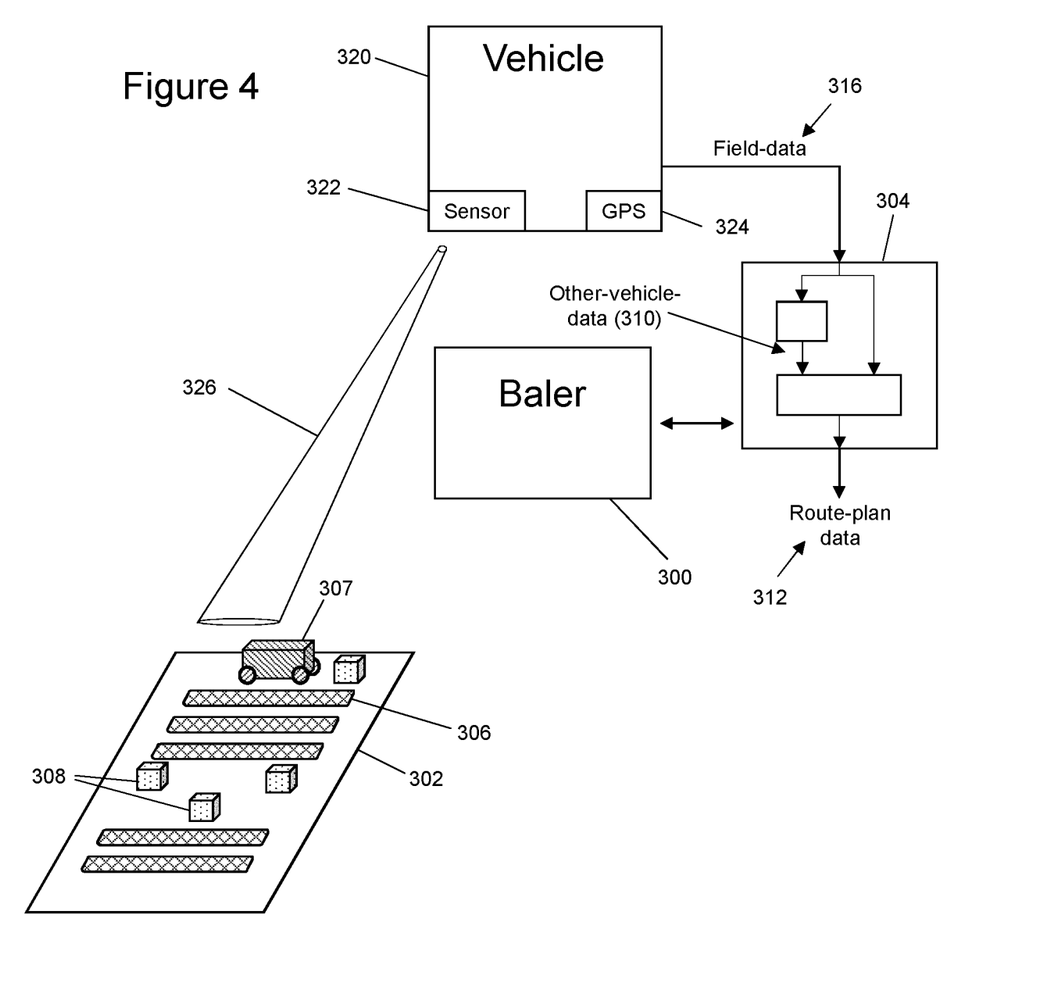
FIG. 4 shows schematically a further system that is associated with determining a route for a baler to follow in an agricultural field.

FIG. 4 shows schematically a further system that is associated with determining a route for a baler 300 to follow in an agricultural field 302. Features of FIG. 4 that are also shown in FIG. 2 or FIG. 3 have been given corresponding reference numbers in the 300 series, and will not necessarily be described again here.

The system includes a vehicle 320. In this example the vehicle is an unmanned vehicle 320. The unmanned vehicle 320 can be an unmanned aerial vehicle (sometimes referred to as a drone). In other examples, the vehicle 320 could be a land vehicle, which may or may not be unmanned.

The unmanned vehicle 320 can include one or more sensors for obtaining field-data 316. A field of view 326 of such a sensor is shown schematically in FIG. 4.

In this example, the unmanned vehicle 320 includes a sensor 322 that can acquire field-data 316. In this example the sensor 322 is a camera that can acquire field-image-data. The field-image-data can be two-dimensional-image-data or three-dimensional-image-data, and in some examples the camera can be a 3D-scanner or 3D-camera.

Alternatively, or additionally, the field-data 316 can include: field-radar-data acquired by a radar, field-LIDAR-data acquired by a LIDAR sensor; field-moisture-data acquired by a moisture-sensor, field-IR-data acquired by an infra-red-sensor, ultrasonic-data acquired by an ultrasonic sensor, or any other type of field-data from any type of sensor that can acquire information about the agricultural field 302 or the crop material in the agricultural field 302. The controller 304 can process one or more of these different types of field-data 316, either directly or indirectly, in order to determine the route-plan-data 312, and optionally vehicle-control-instructions (not shown).

In some examples, the controller 304 can determine crop-property-data that is representative of the crop material in the agricultural field 302, based (directly or indirectly) on the field-data 316. For instance, the controller 304 can perform an object recognition algorithm on the field-image-data in order to determine one or more of crop-type; length of stalks in the material, material density, and stub-height-information. The stub height is the height at which the crop is cut off. In some conditions, such as for wheat straw, the swath lays on top of the stubs, which causes the swath to look bigger than it actually is.

In some examples, the controller 304 can also, or instead, process different types of field-data to determine the crop-property-data. For instance, the controller 304 can process field-IR-data to determine the temperature of crop material, or the controller 304 can process field-moisture-data to determine the humidity/wetness of crop material.

In one example, the crop-property-data can include material-size-data that is representative of the size of the crop material in the agricultural field 302. Such material-size-data can include the height, width, cross-sectional area, volume, or shape of the swath 306. The crop-property-data can therefore represent one-dimensional, two-dimensional or three-dimensional physical characteristics of the crop material, and can be determined based on two-dimensional-image-data or three-dimensional-image-data.

The controller 304 can then determine the route-plan-data 312 for the baler 300 based on one or more of the above types of crop-property-data. In some examples, the controller 304 determines vehicle-control-instructions for the baler 300 based on one or more of the above types of crop-property-data. For example, the controller 304 may cause the baler 300 to travel: (i) more slowly over large portions of crop material (for instance portions that have a material-size-data (such as cross-sectional area) that is greater than a size-threshold-value); (ii) more quickly over thin portions of crop material (for instance portions that have a density that is less than a density-threshold-value), (iii) in a zig-zag path over very narrow swaths to get a good feeding of a pre-compression chamber of the baler 300; and (iv) not changing the speed too aggressively (for example such that the acceleration/deceleration of the baler 300 is not greater than a speed-change-threshold) if there is a small interruption of the swath 306 to improve driver comfort (for example, a small interruption can be identified as a height of the swath 306 that is less than a swath-height-threshold for a length of the path that is less than a path-length-threshold).

It will be appreciated that the above examples are non-limiting and that the baler can be automatically controlled based on crop-property-data in numerous other ways. In some examples, different options can be selected by the operator of the baler/tractor, such as when starting a baling operation. For instance, when starting a field, the operator may be able to enter a 'setting' such as the following:

If I hit a wet spot: how should the controller control the baler/tractor—slow down the speed and continue baling or lift the pick-up; and/or If a highly compressed swath is detected: how should the controller control the baler/tractor—slow down the speed and continue baling or lift the pick-up.

In this way, the controller can determine vehicle-control-instructions for the baler 300 based on: (i) one or more of the above types of crop-property-data; and (ii) user input.

Therefore, in a number of ways, the controller 304 can determine vehicle-control-instructions and/or route-plan-data 312 based on the crop-property-data. For instance, the controller 304 may plan the route for the baler 300 such that regions of the crop material with a higher density are picked up before regions of the crop material that have a lower density. This may be advantageous so that the most valuable crop material (in terms of volume of crop per distance travelled by the baler 300) is picked up first. In another example, the controller 304 may plan the route such that the baler 300 picks up regions of the crop material that have a lower humidity before regions of the crop material that have a higher humidity. In this way, the more humid crop material will have longer to dry out. As a further example, the controller 304 can determine the route-plan-data 312 for the baler 300 based on the time of day that the crop material is to be picked up and/or a measured or predicted temperature of the crop material. It can be advantageous for the crop material to be as cool as possible for baling (for better friction properties). Therefore, the route-plan-data 312 can be planned such that the crop material that is picked up is likely to be below a crop-temperature-threshold. As yet further example, the controller 304 can determine the route-plan-data for the baler 300 based on the humidity/wetness of crop material such that wet spots of the crop material can be baled after each other so as not to mix wet and dry crop in the same bales.

The controller 304 can determine field-property-data that is representative of a property of the agricultural field 302, based on the field-data 316. For instance, the controller 304 can determine first regions of field-data that correspond to the swaths 306 of crop material, and second regions of the field-data that correspond to the agricultural field 302 (outside the perimeter of the first regions of field-data). As discussed above, the controller 304 can determine crop-property-data based on data that corresponds to the first regions of field-data. The controller 304 can also determine field-property-data based on the second regions, and then determine the vehicle-control-instructions and/or route-plan-data 312 based on the field-property-data.

The field-property-data can include field-wetness-data that is representative of the wetness of the agricultural field 302. In such an example, the controller 304 can process field-data to identify the locations of the second regions of the field-data that correspond to the agricultural field 302, and then determine the field-wetness-data based on field-moisture-data acquired by a moisture-sensor for the identified second regions. The controller 304 can then control the speed of the baler 300 accordingly, for example to prevent the baler 300 from travelling faster than a speed-threshold-value in parts of the field 302 that have a field-wetness-data that exceeds a wetness-threshold-value.

The field-property-data can also include field-contour-data that is representative of contours of the agricultural field 302. A user can provide the field-contour-data to the controller 304 in some examples because this data acquisition can be considered as a one-time job. In other examples, the controller 304 can determine the field-contour-data based on the field-image-data or field-radar-data, for example. The controller 304 can then determine the vehicle-control-instructions and/or route-plan-data 312 based on the field-contour-data. For instance, for regions of the agricultural field 302 that have a steep slope (for example, field-contour-data that is representative of a gradient that is greater than a gradient-threshold-value), the controller 304 may determine route-speed-instructions for automatically controlling the speed of the baler 300 such that it does not exceed a speed-threshold-value. Also, in such circumstances, the controller 304 may determine vehicle-steering-instructions that prevent a steering angle of the baler 300 from exceeding a steering-angle-threshold-value. As another example, the controller 304 can determine the route-plan-data for the baler 300 based on the field-contour-data. For example, the controller 304 can calculate a route that, for a big swath on a flank, results in the baler 300 picking up the crop material as it is travelling down a slope that has a gradient that is greater than a gradient-threshold-value. This can provide advantages because in some applications, a tractor that is pulling baler 300 may not have sufficient power to maintain its optimal speed.

In some examples, the vehicle 320 can include a height-measurement-sensor for acquiring material-height-data representative of the height of the crop material. The controller 304 can then determine the vehicle-control-instructions and/or route-plan-data 312 based on the material-height-data. For instance, the controller 304 may set the route-speed-instructions for the baler 300 based on the material-height-data, such that the baler 300 travels more slowly when the height of the crop material is relatively large. The height measurement can be used as an indicator of the size of the swath 306. If multiple height measurements are taken whilst the vehicle 320 is moving, they can be combined in order to provide a 3D-scan. The height-measurement-sensor can also be used to measure stub-height-information, which is representative of stub height, if the stub density is high enough. Irrespective of how the stub height is determined, in some examples the controller 304 can subtract the stub height from the measured height of the crop in order to determine swath-height-data. The controller 304 can then determine the vehicle-control-instructions and/or route-plan-data 312 based on the swath-height-data.

In some examples, the controller 304 can determine a bale-count, representative of an estimate of the number of bales that will be attained by picking up all of the crop material, based on the field-data 316. For instance, the controller 304 can process material-size-data (representative of the size of the crop material), and calculate total-crop-amount that is representative of the total amount of crop that is to be picked up. The controller 304 can then divide the total-crop-amount by the volume of a single bale to determine the bale-count. Providing the bale-count as an output can be useful for planning the operation of picking up the crop material. For instance, the number of trucks that will be needed to collect the bales 308, and how long the job will take, can be estimated in advance. This type of information can be particularly advantageous inputs for work planning. For instance, the controller 304 can process the total-crop-volume and/or bale-count in order to determine energy requirements of the baler 300. For example, if the total-crop-volume is very large, then the controller 304 can determine that the baler 300 will have to return at some point to a location where it can refill with more energy/fuel. Therefore, the controller 304 can determine a route that takes this into account, and/or can automatically control the baler 300 such that its available energy/fuel is used in an appropriate way for the required future refill of energy/fuel. The controller 304 can determine both an initial bale-count and/or energy requirements prior to the operation of picking up the crop material, and an updated bale-count and energy requirements during the operation.

The vehicle 320 can acquire: (i) field-data 316 that is representative of the agricultural field 302 that has the other vehicle 307 located in it; and (ii) field-location-data (not shown) associated with the field-data 316. The controller 304 can optionally determine the route-plan-data 312 based on the field-data 316 and the field-location-data.

In this example, the vehicle 320 acquires field-location-data associated with field-image-data. For example, the vehicle 320 may have a location-determining-system 324, such as GPS, that provides vehicle-location-data that is representative of the location of the vehicle 320 when the field-image-data is acquired. The controller 304 may also receive camera-direction-data and vehicle-altitude-data. The camera-direction-data may be representative of the direction that the camera is facing relative to the vehicle 320. The camera-direction-data may be hard coded if the camera is non-movably fixed to the vehicle 320. If the camera is movably mounted to the vehicle 320, then the camera-direction-data can take different values, which may be received as an input-signal at the controller 304 from the vehicle 320. The controller 304 can then use a simple trigonometric algorithm to attribute field-location-data to objects/areas that are represented by the field-image-data based on the vehicle-location-data, the camera-direction-data, a vehicle-altitude-data (if the vehicle 320 is an aerial vehicle), and a direction of travel of the vehicle 320, as is known in the art.

In some examples, the controller 304 can determine the other-vehicle-data 310 based on the field-data 316 and the field-location-data. The controller 304 can determine one or more of other-vehicle-location-data, other-vehicle-speed-data, other-vehicle-direction-data, and other-vehicle-dimension-data based on the field-data and/or the field-location-data. In which case, the controller 304 can determine some, or all, of the other-vehicle-data based on the field-data 316 and the field-location-data, and the controller 304 may not need to receive the other-vehicle-data 310 separately such as directly from the other vehicle 307.

Use of an aerial vehicle 320 can enable field-data 316 to be acquired from a relatively high altitude to obtain an overview of the field 302, thereby providing a wide field of view. Subsequently or alternatively, the aerial vehicle 320 can stay with the baler 300 at a lower altitude. The gathered field-data 316 can be streamed to the controller 304 and/or "the cloud". When the aerial vehicle 320 stays with the baler 300, one or more of the following strategies can be deployed. Firstly, the aerial vehicle 320 can fly above the baler 300 to get information about the surroundings of the baler 300. In this way, it can detect objects ahead of the baler 300 and also determine one or more properties of the other vehicle 307. Secondly, the aerial vehicle 320 can fly ahead of the baler 300 to scan the future trajectory of the baler 300 for objects. Thirdly, the aerial vehicle 320 can scan the whole field 302 to get an overview of any obstacles, including other vehicles 307.

It will be appreciated that one or more of the functions of the vehicle 320 that are described with reference to FIG. 4 could be implemented by the agricultural vehicle/baler 300 itself in some examples. For example, field-data and crop-property-data could be determined by processing signals acquired by sensors on the agricultural vehicle/baler 300.

One or more of the examples disclosed herein can improve the safety with which a baler operates because collisions with objects, such as other vehicles 307, are less likely.

Systems described herein can dynamically map and/or predict characteristics of other vehicles in the field during baling, and can utilise technology to gather the data for mapping the other vehicles, and can determine a route for the baler and/or automatically control the baler. In some examples, a drone can be used for mapping the other vehicle. Also, information about the other vehicles that is produced by the other vehicle itself, can be used.

It will be appreciated that any of the control operations disclosed herein, such as setting the speed or direction of travel of the baler or an associated tractor, can be performed by comparing data with one or more threshold values, applying an algorithm to data, or using a look-up-table/database to determine a control value based on received/determined data.

The invention claimed is:

1. A system comprising:
    a controller associated with an agricultural vehicle, the agricultural vehicle being a baler, the baler having a baler-priority-value associated with it,
    wherein the controller is configured to:
        receive other-vehicle-data that is representative of another vehicle that is in an agricultural field, the other vehicle having an other-vehicle-priority-value associated with it;
        compare the baler-priority-value with the other-vehicle-priority-value;
        only modify the earlier route plan if the baler-priority-value represents a lower priority than the other-vehicle-priority-value;
        determine route-plan-data that is representative of a route to be taken by the agricultural vehicle in the agricultural field, based on a predicted path of the other vehicle the other vehicle; and
        control the agricultural vehicle based on the route-plan-data.

2. The system of claim 1, wherein the controller is configured to determine the route-plan-data such that the agricultural vehicle will avoid the other vehicle.

3. The system of claim 1, wherein the other-vehicle-data comprises other-vehicle-route-data that is representative of a route to be taken by the other vehicle.

4. The system of claim 1, wherein the other-vehicle-data comprises other-vehicle-dimension-data that is representative of a size or shape of the other vehicle.

5. The system of claim 1, wherein the other-vehicle-data comprises other-vehicle-location-data that is representative of a location of the other vehicle.

6. The system of claim 5, wherein the other-vehicle-location-data comprises one or more of:
    past-other-vehicle-location-data, which is representative of a previous location of the other vehicle;
    current-other-vehicle-location-data, which is representative of a current location of the other vehicle; and
    future-other-vehicle-location-data, which is representative of a future location of the other vehicle.

7. The system of claim 1, wherein the other-vehicle-data comprises other-vehicle-speed-data that is representative of a speed of the other vehicle.

8. The system of claim 1, wherein the other-vehicle-data comprises other-vehicle-direction-data that is representative of a direction of travel of the other vehicle.

9. The system of claim 1, wherein the controller is further configured to:
    receive field-data that is representative of crop material that is to be picked up from the agricultural field by the agricultural vehicle; and
    determine the route-plan-data also based on the field-data.

10. The system of claim 9, wherein the controller is further configured to receive updated field-data as the agricultural machine picks up the crop material from the agricultural field.

11. The system of claim 1, wherein the controller is configured to determine the route-plan-data by modifying an earlier route plan while the agricultural vehicle is in use in the agricultural field.

12. The system of claim 1, wherein the controller is further configured to determine vehicle-control-instructions for the agricultural vehicle, based on the route-plan-data.

13. A system, comprising:
    a controller associated with an agricultural vehicle having a priority-value associated with it,
    wherein the controller is configured to:
        receive other-vehicle-data that is representative of another vehicle that is in an agricultural field, the other vehicle having an other-vehicle-priority-value associated with it;
        compare the priority-value with the other-vehicle-priority-value;
        only modify the earlier route plan if the priority-value represents a lower priority than the other-vehicle-priority-value;

determine route-plan-data that is representative of a route to be taken by the agricultural vehicle in the agricultural field, based on the other-vehicle-data; and determine vehicle-control-instructions for the agricultural vehicle, based on the route-plan-data, wherein the vehicle-control-instructions comprise vehicle-steering-instructions for automatically controlling a direction of travel of the agricultural vehicle, wherein the system further comprises the agricultural vehicle that is further configured to be operated in accordance with the vehicle-control-instructions.

14. The system of claim 13, wherein the vehicle-control-instructions further comprise route-speed-instructions for automatically controlling a speed of the agricultural vehicle at locations along the route.

15. The system of claim 1, further comprising:
an unmanned vehicle configured to acquire:
field-data, representative of an agricultural field that has the other vehicle in it; and
field-location-data associated with the field-data; and
wherein the controller is configured to determine the other-vehicle-data based on the field-data and the field-location-data.

16. The system of claim 15, wherein the controller is further configured to:
determine other-vehicle-dimension-data that is representative of a size of the other vehicle, based on the field-data; and
determine the route-plan-data also based on the other-vehicle-dimension-data.

17. The system of claim 1, wherein the route-plan-data is representative of a route to be taken by the agricultural vehicle for an entire unprocessed portion of the agricultural field.

18. A system, comprising:
a controller associated with an agricultural vehicle, a priority-value being associated with the agricultural vehicle,
wherein the controller is configured to:
receive other-vehicle-data that is representative of another vehicle that is in an agricultural field, the other vehicle having an other-vehicle-priority-value associated with it;

compare the priority-value with the other-vehicle-priority-value;

only modify the earlier route plan if the priority-value represents a lower priority than the other-vehicle-priority-value;

determine route-plan-data that is representative of a route to be taken by the agricultural vehicle in the agricultural field, based on the other-vehicle-data; and determine vehicle-control-instructions for the agricultural vehicle, based on the route-plan-data, wherein the system further comprises the agricultural vehicle that is further configured to be operated in accordance with the vehicle-control-instructions.

19. The system of claim 18, wherein the agricultural vehicle is a baler.

* * * * *